(12) United States Patent
Jacobson et al.

(10) Patent No.: US 7,948,876 B2
(45) Date of Patent: *May 24, 2011

(54) METHOD OF DETECTING NON-RESPONSIVE NETWORK FLOWS

(75) Inventors: Van Jacobson, Woodside, CA (US); Li Fan, San Jose, CA (US); Kathleen Nichols, Woodside, CA (US)

(73) Assignee: Cisco Technology, Inc., San Jose, CA (US)

( * ) Notice: Subject to any disclaimer, the term of this patent is extended or adjusted under 35 U.S.C. 154(b) by 1142 days.

This patent is subject to a terminal disclaimer.

(21) Appl. No.: 11/146,585

(22) Filed: Jun. 7, 2005

(65) Prior Publication Data
US 2005/0226149 A1 Oct. 13, 2005

Related U.S. Application Data

(63) Continuation of application No. 09/769,544, filed on Jan. 25, 2001, now Pat. No. 6,934,256.

(51) Int. Cl.
*G01R 31/08* (2006.01)
(52) U.S. Cl. ........ 370/229; 370/252; 370/235; 370/392; 370/469
(58) Field of Classification Search .......... 370/229–240, 370/252, 412, 392, 469
See application file for complete search history.

(56) References Cited

U.S. PATENT DOCUMENTS

| | | | |
|---|---|---|---|
| 6,646,988 B1 * | 11/2003 | Nandy et al. ................ | 370/235 |
| 6,671,258 B1 * | 12/2003 | Bonneau .................... | 370/235 |
| 6,690,645 B1 * | 2/2004 | Aweya et al. ............... | 370/230 |
| 6,788,697 B1 * | 9/2004 | Aweya et al. ............... | 370/412 |
| 6,934,256 B1 * | 8/2005 | Jacobson et al. ............ | 370/235 |
| 7,046,665 B1 * | 5/2006 | Walrand et al. ............. | 370/392 |
| 7,426,471 B1 * | 9/2008 | Briscoe et al. .............. | 705/1.1 |
| 2002/0057699 A1 * | 5/2002 | Roberts .................. | 370/395.32 |
| 2002/0089930 A1 * | 7/2002 | Aceves et al. .............. | 370/230 |

OTHER PUBLICATIONS

Sally Floyd and Van Jacobson, "Random Early Detection Gateways for Congestion Avoidance" pp. 1-22, Aug. 1993.
V. Jacobson et al., "RED in a Different Light", pp. 1-38, Sep. 30, 1999.
Jacobson, Van, "Notes on Using RED for Queue Management and Congestion Avoidance", Jun. 8, 1998.

* cited by examiner

*Primary Examiner* — Ricky Ngo
*Assistant Examiner* — David Oveissi
(74) *Attorney, Agent, or Firm* — Cesari and McKenna, LLP

(57) ABSTRACT

A network device identifies a non-adaptive flow as follows. The network device drops packets on a random basis using a Random Early Detection (RED) algorithm. A classifier reads indicia of a flow from at least one field of a header of a packet received by the network device. The network device calculates a drop interval for packets of the flow dropped by the RED algorithm, in response to a time at which the packets were dropped. The network device then applies a statistical test to drop intervals of a plurality of flows in order to identify the non-adaptive flow.

31 Claims, 15 Drawing Sheets

900

STATE MAINTAINED FOR DROPPED PACKETS

| PACKET N | FLOW IP SA IP DA (OTHER INDICIA) | TIME OF DROP |
|---|---|---|
| | | |

FLOW ANALYSIS FOR DROPPED PACKETS

FOR EACH FLOW

| PACKET<br>N | TIME OF<br>DROP<br>T | DROP INTERVAL<br>= T(THIS) - T(LAST) |
|---|---|---|
| | | |

METHOD OF DETECTING NON-RESPONSIVE NETWORK FLOWS

RELATED CASES

This application is a Continuation of U.S. patent application Ser. No. 09/769,544 filed on Jan. 25, 2001, now issued as U.S. Pat. No. 6,934,256 on Aug. 23, 2005.

FIELD OF THE INVENTION

This invention relates to regulation of flows of packets in computer networks, and more particularly to identifying non-adaptive flows.

BACKGROUND OF THE INVENTION

A plurality of different source end nodes transmit packets onto a computer network. A "flow" of packets is identified by contents of fields in the packet, for example by the Layer 3 source address, destination address, protocol type field, etc. Flows are also identified by internal parameters of the router, for example input port and output port. Different types of flows may be identified by choosing different combinations of fields to identify the flow, including fields from the layer 2 header, the layer 3 header, the layer 4 header, etc.

When a destination end node receives a packet from the network, the destination end node ordinarily communicates with the source end node in order to let the source end node know that the packet was received. For example, in the TCP/IP unicast protocol the destination end node transmits an acknowledgement message (ACK) to the source end node indicating that a packet was received. Until the ACK is received, the source end node keeps a copy of the transmitted packet in memory so that the packet can be resent in the event that no ACK is received after expiration of a re-transmit time period.

TCP/IP is an "adaptive flow" protocol. By an "adaptive flow" it is meant that, in the event that no ACK indications are received for a packet, or for a plurality of packets, an adaptive transmitter slows down its rate of transmission for that flow. One method of regulating a transmission rate of packets is the use of a sliding window, as is implemented in the TCP/IP protocol. TCP/IP slows down the rate of packet transmission by reducing the number of packets transmitted during a window opportunity, and thereby places a longer average time interval between the transmitted packets. In common implementations of TCP/IP, the window width is divided by two (2) each time that the retransmit timer times out. Also, typically, the retransmit time interval is doubled upon a timeout event. Later, as packets are received by the destination station and ACK messages are received by the source station, the source station then slowly increases its window width, and the retransmit timer timeout interval is shortened. This dynamic behavior adjusts the transmission rate and retransmit timer timeout interval to network parameters, especially as those parameters change dynamically with time.

Following a reduction in transmission rate, and after receiving a plurality of ACK indications that its packets are now being received by the destination end station, the adaptive transmitter, using TCP/IP or some other adaptive protocol, begins slowly increasing its transmission rate until the rate is back up to the maximum transmission rate permitted.

Network devices may typically be a router serving as a node in the network, where the router typically operates by reading and reacting to layer 3 fields read from the packet layer 3 header. Alternatively, the network device may be a layer 2 switch, where the switch reacts to fields read from the packet layer 2 header. Further, some network devices read and react to fields read from the layer 4 header of a packet, etc. All such network devices are subject to congestion when packets arrive at the devices faster than the devices can handle the arriving packets.

Not all transmitting end nodes employ adaptive transmission techniques. An end node which does not adapt is referred to as producing a "non-adaptive" flow. A non-adaptive flow is frequently bad for the computer network, because for flows through a congested network device the adaptive transmitter will reduce its flow rate, however the non-adaptive transmitter will continue to blast packets at the network device without regard to the congestion. The non-adaptive flows then begin to occupy more and more of the bandwidth of the congested network device. That is, the "bad" flows begin to hog more and more of the congested bandwidth of the intermediate node network device.

A method of identifying non-adaptive flows is required in order for a network device to take appropriate action.

SUMMARY OF THE INVENTION

A network device identifies a non-adaptive flow as follows. In the presence of congestion, the network device drops packets on a random basis using a Random Early Detection (RED) algorithm. The RED algorithm is used by the network device to calculate a drop interval for the arriving packet stream based on the current congestion level of the target queue. In this invention, when a packet is dropped, one or more header fields of the packet are stored, along with a timestamp of the drop time. The stored data is used to test for non-adaptive flows in a two-step process. First, a flow is only tested if it has a significant share of the recorded total drops. For flows for which this is true, the stored drop data is used by the network device to compute drop intervals on a per-flow basis, where a "flow" is indicated by one or more fields in the packet header. The network device applies statistical testing to the drop intervals in order to identify non-adaptive flows. The network device may apply the invention at any suitable time interval in order to avoid interfering with the packet forwarding and other work of the network device.

In an exemplary embodiment of the invention, the network device calculates a drop interval for packets of the selected flow dropped by the RED algorithm, in response to a time at which the packets were dropped. The network device then applies a statistical test to drop intervals of a plurality of flows in order to identify the non-adaptive flow.

The drop interval is calculated by subtracting from a first measured time at which the most recently received packet was dropped, a second measured time at which an earlier dropped packet was dropped. The statistical test is performed by first computing an average drop interval for the selected flow. Next the median drop interval for the selected flow is computed, the median drop interval having one half of the drop intervals larger than the median and having one half of the drop intervals less than the median. Also the average drop interval for the recorded drop intervals is computed. The drops of a non-responsive flow should be distributed in a uniformly random way over time, thus their time intervals should have an exponential distribution. For an exponential density function, the median drop interval is expected to be 0.693 times the average drop interval.

A quantity referred to as the "Departure from Exponential Mean" (DEM) is computed by determining the number of a flow's drop intervals that are smaller than the experimental average, and then dividing by the total number of drop intervals. Then, a value greater than 0.5 indicates a flow with more short drop intervals than the predicted median, and a value smaller than 0.5 indicates a flow with longer intervals than the predicted median for an exponential. The oscillatory adaptive flows have more long drop intervals than the exponential predicts, and so generally have a smaller value of DEM than 0.5. Stated differently, the drops of properly adapting flows should be periodic in time, thus the drop intervals will be longer than what the exponential predicts, and so generally have a smaller value of DEM than 0.5

The statistical test is performed by comparing the DEM value with the number 0.5, and in the event that the DEM value is within a preselected range of 0.5, the flow is identified as non-adaptive. The preselected range may be chosen between 0.45 and any number larger than 0.5.

The preselected range may be dynamically selected in response to DEM values of selected flows, especially as congestion becomes worse at the network device. The non-adaptive flows may have a larger DEM value as multiple randomly arriving adaptive flows have packets dropped on a random basis. The adaptive flows may be selected as a subset of all flows, the subset having selected values of DEM less than a largest value of DEM computed in a set of flows, and the non-adaptive flows identified as those having the larger values of DEM.

In an exemplary implementation of the invention, a classifier reads indicia of a selected flow from at least one field of a header of a packet received by the network device. The flow is then classified and steered away from the normal queue to a special queue, particularly in the event that the flow is found to be non-responsive. The special queue may then operate at a lower priority, or drop packets, etc.

BRIEF DESCRIPTION OF THE DRAWINGS

Turning now to the drawings in which like numerals represent like parts in the several views:

FIG. 9 is a table holding state information maintained by a network device for dropped packets, in accordance with the invention;

FIG. 10 is a table holding state information maintained by a network device for dropped packets, in accordance with the invention;

DETAILED DESCRIPTION OF AN
ILLUSTRATIVE EMBODIMENT

Figure 1:
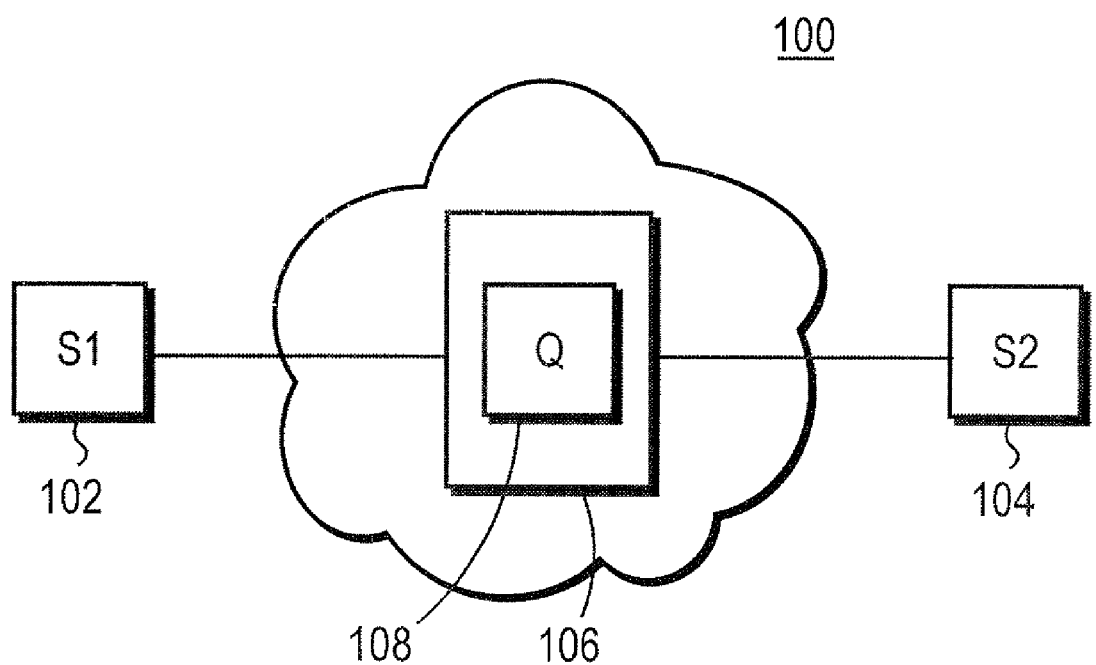
FIG. 1 is block diagram of a computer network.

Turning now to FIG. 1, Computer Network 100 is shown. Computer Network 100 represents a general computer network, from a small local area network to the entire worldwide Internet. End-station 102 serves as a source station for transmission of data packets in this example, and end-station 104 serves as a receiving station for the packets transmitted by source station 102. As the packets traverse network 100 the IP source address of the packets is "S1", representing source station 102. The IP destination address of the packets is "S2" representing station 104. Gateway 106 represents a network device through which the packets must pass on their travels from source station 102 to destination station 104.

Gateway 106 may be a layer 2 switch within the network 100, may be a router operating at layer 3, or may be any other convenient intermediate network device. We refer to gateway 106 as a "gateway" because it serves as a bandwidth limiting feature in the path that the packets take from source station 102 to destination station 104.

A queue 108 within gateway 106 receives packets as they arrive from source station 102, and serves as a buffer as the packets are transmitted by gateway 106 to destination station 104. For example, queue 108 may be a rate limiting queue placed at an output port of a router, where the function of queue 108 is to buffer bursts of packets received from a source station, and to transmit them at regularly timed intervals on an outgoing link from gateway 106.

A Random Early Detection (RED) gateway algorithm is executed within gateway 106 for congestion avoidance in network 100. The RED gateway algorithm detects incipient congestion by reacting to the average queue size. When the average queue size exceeds a preset threshold, gateway 106 drops arriving packets with a certain probability. The exact probability is a function of average queue size. The RED gateway keeps the average queue size low while allowing room for occasional bursts of packets in the queue. Operation of a Random Early Detection (RED) gateway is described in the paper by Sally Floyd and Van Jacobson, in their paper entitled "*Random Early Detection Gateways for Congestion Avoidance*", IEEE/ACM Transactions on Networking, August 1993, all disclosures of which are incorporated herein by reference.

Also, operation of a Random Early Detection (RED) gateway is described in the paper by V. Jacobson, K. Nichols and K. Poduri, in their paper entitled "*RED in a Different Light*", dated Sep. 30, 1999, unpublished but widely circulated, and available on the Internet.

Further similar information is given in *Notes on Using RED for Queue Management and Congestion Avoidance*, talk at The North American Network Operators Group (NANOG), NANOG 13, Dearborn, Mich., June 1998, available on the Internet.

Other documents concerning the RED algorithm are available on the Internet from the Lawrence Berkley Laboratory web site.

Figure 2:
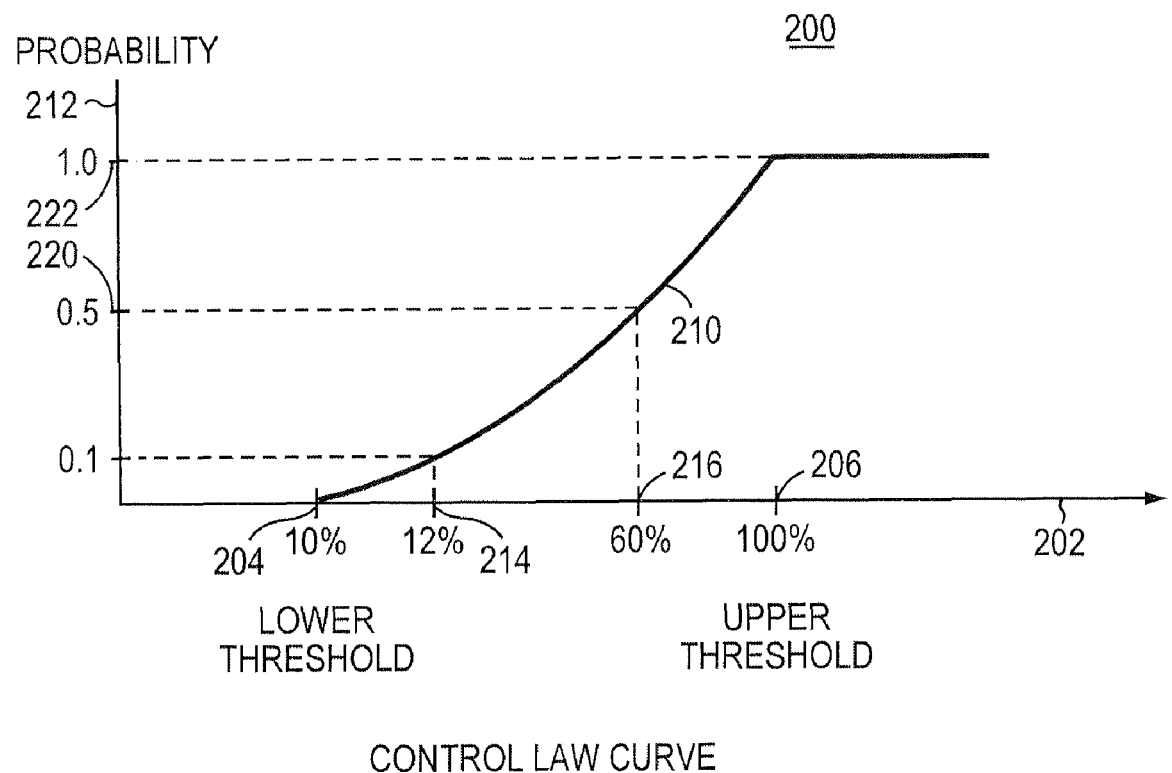
FIG. 2 is a graph of a control law in a RED algorithm controller.

Turning now to FIG. 2, a control law implemented in a RED algorithm is illustrated in graph 200. The horizontal axis 202 represents a quantity giving the amount by which queue 108 is full. A lower threshold is shown at point 204, and an upper threshold is shown at point 206. For example, the lower threshold is set, for illustrative purposes, at a filling quantity of 10%. Also, for example, the upper threshold 206 is shown as the queue being 100% full.

Curve 210 translates the measure of how full the queue is, indicated on the horizontal axis, into a probability for dropping packets. The probability for dropping packets is plotted on the vertical axis 212. For example, at or below the lower threshold 204 in filling the queue, the probability for dropping a packet is computed by curve 210 to be "0". However at a slightly higher degree of filling of the queue, for example at 12% at point 214, the probability for dropping a packet is computed by curve 210 to be 10% (probability P equals 0.1). Further, as the queue becomes more filled, for example at point 216 where the queue is represented as 60% full, curve 210 computes the probability P for dropping a packet to be 0.5 at location 220, that is a 50% probability for dropping a packet. When the queue filling reaches the upper threshold 206, curve 210 indicates, at point 222 that the probability for dropping a packet is be 1.0, that is 100% (probability P of 1.0). That is, when the queue filling reaches the upper threshold 206, all packets arriving at gateway 108 are dropped.

Figure 3:
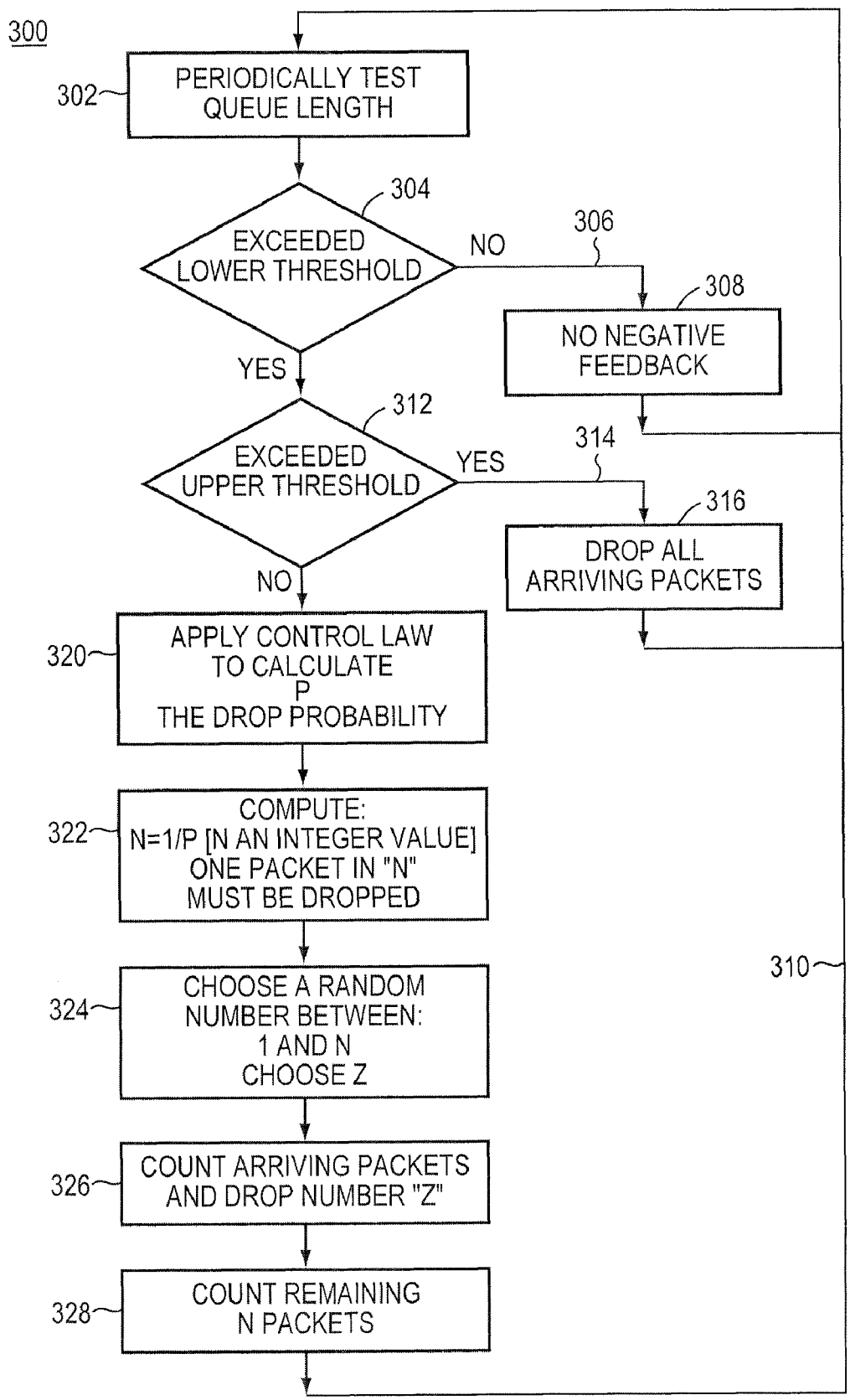
FIG. 3 is a flow diagram of a RED algorithm controller

Turning now to FIG. 3, a flow chart 300 showing operation of the RED gateway is shown. Particularly, flow chart 300 shows how a packet is chosen for being dropped by the RED gateway 106. Starting with block 302, the queue 108 is periodically tested to determine the length of the queue. After a queue length determination is made the process goes to block 304.

At block 304 the queue length is tested to determine if it exceeds the lower threshold 204. In the event that the lower threshold is not exceeded, the process goes along path 306 to block 308 where it is determined that no negative feedback is required. From block 308 the process returns along path 310 to block 302 for again periodically determining the queue length.

In the event that block 304 tests "yes", that the lower threshold was exceeded, the process goes to block 312. At block 312 the queue length is tested to determine if the upper threshold 206 has been exceeded. In the event that block 312 answers "yes", the upper threshold is exceeded, the process goes along path 314 to block 316.

At block 316 the process decides to drop all arriving packets. From block 316 the process returns along path 310 to again periodically test the queue length at block 302. In the event that block 312 answers "No", the upper threshold was not exceeded, the process goes to block 320.

At block 320 the control law, for example the control law 200 shown in FIG. 2, is used to calculate the probability that a packet should be dropped. The probability is represented by the symbol "P". The probability "P" is computed by using the measured queue length and applying the control law 200 in order to determine the probability "P". After the probability "P" is computed, the process goes to block 322.

At block 322 the inverse of the probability is computed, where the inverse is represented by "N", and "N" is rounded to an integer value. "N" represents the fact that application of the RED algorithm requires that one packet in "N" must be dropped in order to avoid congestion. After calculation of the value of "N" at block 322, the process goes to block 324.

At block 324 a random number generator is queried, and a random number is chosen between the values of 1 and "N". The random number between 1 and "N" which is chosen is represented by the symbol "Z". Upon choosing the random number "Z" which lies between "1" and "N", the process goes to block 326.

At block 326 the process counts the arriving packets and drops packet number "Z". By counting the arriving packets, and dropping the "Z'th" packet, the RED algorithm imposes the control law 200, by applying a probability for dropping incoming packets, and applies that probability by choosing a random packet within the range of "1" to the inverse of the probability. After dropping the "Z'th" packet, the process goes to block 328.

At block 328 the process counts the remaining "N" packets. After counting the remaining "N" packets as they arrive at queue 108 of gateway 106, the process returns along path 310 to block 302 where the queue length is again periodically tested.

Process 300 continues, for example, periodically testing queue length at block 302, and dropping a randomly selected packet at block 326 when the queue length is between the lower threshold 204 and the upper threshold 206.

As an example, other indicia of congestion besides queue length may be used as the control parameter in control law 200. For example, the control law 200 shown in FIG. 2 uses queue length as a detection parameter for congestion. Other parameters showing congestion, or incipient congestion, may be computed at block 302, and a lower threshold and upper threshold for the other parameter tested so that in the event that the measured parameter lies between the lower threshold and the upper threshold, a randomly arriving packet may be dropped at block 326.

Figure 4:
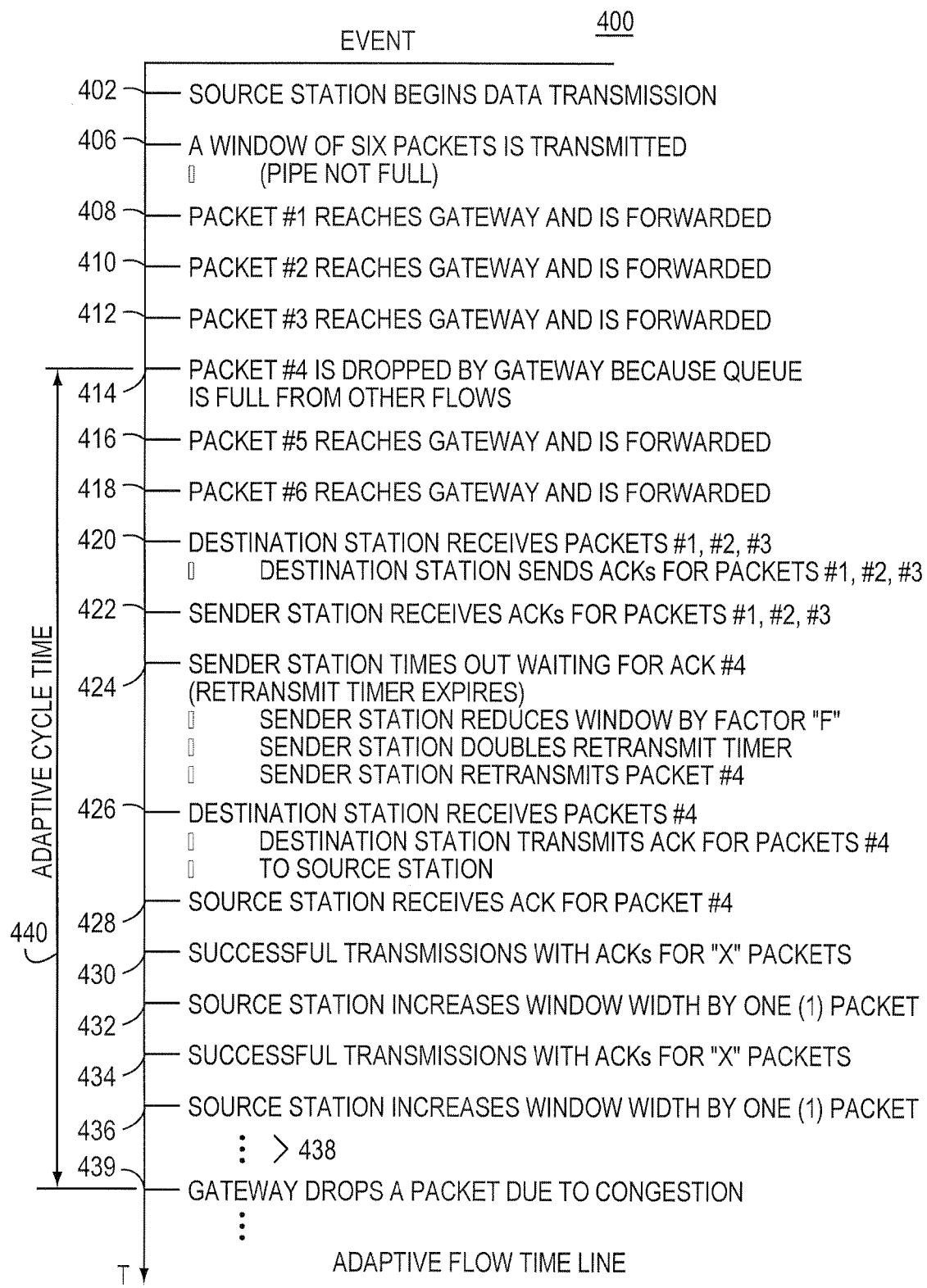
FIG. 4 is a time line diagram of events in a computer network employing a RED algorithm controller.

Turning now to FIG. 4, a timeline 400 for end-to-end operation of the packet transfer from source end-station 102 to destination end-station 104 is shown. For example, source end-station 102 and destination end-station 104 may implement an adaptive transfer protocol for reliable packet transfer. For example, the source end-station 102 and destination end-station 104 may implement the TCP/IP protocol, which is an adaptive protocol for reliable packet transfer. The TCP/IP protocol is used in the Internet for many types of data transfer. The TCP/IP protocol is described by W. Richard Stevens in his book: *TCP/IP Illustrated, Vol.* 1*, Vol.* 2*, Vol.* 3, published by Addison Wesley, Copyright date 1994, all disclosures of which are incorporated herein by reference.

In short, the TCP/IP protocol requires that the destination station transmit an acknowledgement message (ACK) to the source station, upon receipt by the destination station 104 of a complete packet. Packets carry a serial number, and a serial number of the last properly received packet is transmitted within the ACK message from the destination station to the source station. Meanwhile, the source station maintains in memory all of its transmitted packets until it receives an ACK message, or until a retransmit timer times out. In the event of the retransmit timer times out, the source station retransmits the packet. By exchanging ACK messages in this manner, the source station and destination station establishes a reliable communications path for data packets. Also, the adaptive nature of the source end-station executing the TCP/IP protocol is that the source station reduces the rate at which it transmits packets upon the time-out of the retransmit timer. The source station reduces the rate at which it transmits packets after a retransmit timer times out on the assumption that the packet was lost due to congestion within the network. By reducing the rate at which it transmits packets, the source station accommodates its transmission rate to the congestion state of the network. Details of this adaptive process are set out in the book by Stevens, *TCP/IP illustrated, vol.* 1.

The timeline 400 indicates principal events in the adaptive process of the TCP/IP protocol, as an example of an adaptive method of congestion avoidance, or congestion control, within a computer network. At time 402 the source station begins data transmission. At time 406 a window of packets is transmitted, and for example, the timeline shows a window of six (6) packets being transmitted. We assume further that the "pipe" between the source station 102 and destination station 104 is not filled by this window of packets being transmitted by source station 102. At time 408 packet number 1 reaches gateway 106 and is forwarded to destination station 104. At time 410 packet number 2 reaches gateway 106 and is forwarded to destination station 104. At time 412 packet number 3 reaches gateway 106 and is forwarded to destination station 104.

At time 414 packet number 4 reaches gateway 106. However packet number 4 is dropped by gateway 106 as the gateway executes the RED congestion avoidance algorithm, as shown in FIG. 2 and FIG. 3.

At time 416 packet number 5 reaches the gateway and is forwarded to destination station 104. At time 418 packet number 6 reaches the gateway and is forwarded to destination station 104. Following time 420, the destination station 104 receives packets number 1, number 2 and number 3. Also, destination station 104 sends ACKs for packets number 1, number 2, and number 3, to source station 102. At time 422 the source station 102 receives the ACKs for packets number 1, number 2 and number 3.

At time 424 source station 102 times out its retransmit timer for packet number 4. That is, no ACK is received by source station 102 for packet number 4 because packet number 4 was dropped at time 414 by gateway 106. Also, beginning at time 424 the source station 102 reduces its window by a factor "F". In commonly implemented TCP/IP protocols in source stations, the window is reduced by a factor of 2, that is "F" is "2". Also, in accordance with the TCP/IP protocol the source station doubles the time-out time for the retransmit timer. The retransmit timer timing is doubled on the assumption that the timer time interval is too short for the roundtrip time in the network, and so this feature of TCP/IP assists the source station in adapting its timer specification to actual round trip times in the network. Also at time 424 the source station retransmits packet number 4.

At time 426 the destination station 104 receives packet number 4. Also at time 426 the destination station 104 transmits an ACK for packet number 4 to source station 102.

At time 428 the source station receives the ACK for packet number 4.

At time 430 it is determined that successful transmission of packets from source station 102 to destination station 104 for a number of packets represented by "X" has been accomplished. That is, source station 102 transmitted "X" packets addressed to destination station 104, and received ACK messages for each of those packets before the retransmit timer of source station 102 expired.

Upon the successful completion of transmission of "X" packets to the destination end-station, at time 432 the source station increases its window width by one packet, in order to increase the rate at which it transmits packets into the network. It is common in implementations of TCP/IP for the number "X" to be selected as 4. Thus upon the successful transmission of four packets the window width of the source station is increased by one packet. At time 434 it is determined that another number of "X" packets have been successfully transmitted from source station 102 to destination station 104, and so at time 436 the source station increases its window width by another one packet.

During the time interval 438, indicated by the "three dots", the source station successfully transmits a plurality of a number "X" of packets to destination station 104, and has increased its transmission rate by increasing its window width by one packet upon each completion. Finally, at time 439 the source station has opened its window for transmission sufficiently that incipient congestion once again is detected by gateway 106, and the gateway drops a packet due to this congestion. The packet dropped is dropped in accordance with the RED algorithm as shown in the flow chart of FIG. 300 applying the control law 200 of FIG. 2. Following time 438, the process repeats the events as described beginning with time 414.

The time interval between time 414 and time 439 is indicated as the "adaptive cycle time" 440. The adaptive cycle time 440 is an approximate periodicity in which the source end station increases its transmission rate until a packet is dropped by a gateway due to congestion in the network. The source end-station decreases its transmission rate by decreasing its window size, and the source end-station then begins slowly to increase its window size until another lost packet is detected by time-out of the retransmit timer of the source end-station.

Figure 5:
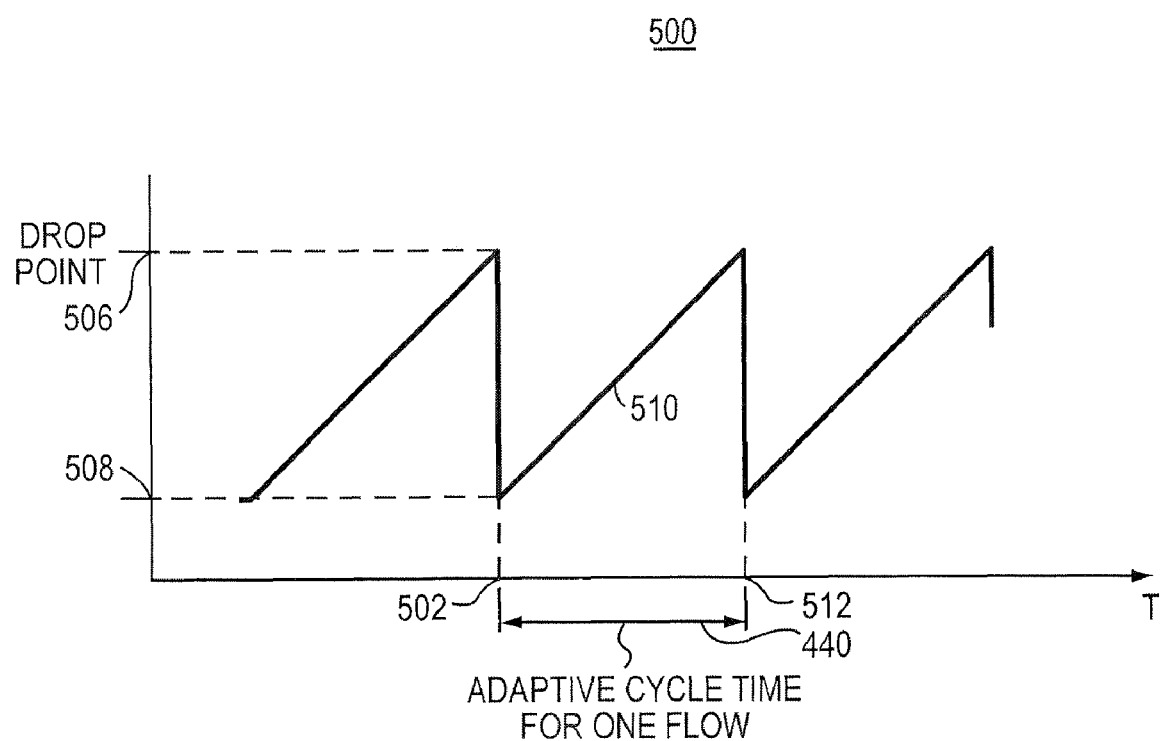
FIG. 5 is a transmission rate of a source end station of an adaptive flow, in accordance with the invention.

Turning now to FIG. 5, graph 500 shows the transmission rate of the source end-station as it dynamically adjusts to packet loss occasioned by congestion at gateway 106. For example, at time 502 the source station has decreased its transmission rate from a rate given by point 506 to a rate given by point 508. Beginning at time 502 the source end-station begins increasing its transmission rate as shown by curve 510 until time 512 when the transmission rate again becomes high enough that the gateway 106 drops a packet due to congestion, as at time 439. The adaptive cycle time for one flow 440 is shown as the period of an oscillatory transmission rate, in graph 500 of FIG. 5.

A flow, for example the transmission of data packets from source station 102 to destination station 104, is indicated by a number of parameters carried in the header of the packet, and more particularly by the source end-station IP address and the destination station IP address, as read from the layer 3 header of the packet. A network such as network 100 may have many, tens, hundreds, thousands, of source stations such as station 102, transmitting data packets to destination stations, such as station 104, with the flows passing through gateway 106. Each of these flows will have its own periodicity. The periodicity is determined by the packet's round trip time, including: the time required for receipt of packets traversing the network 100 from the source station to the destination station; and, the time required for ACKs transmitted by the destination station traversing the network 100 and being received by the source station. Also, different implementations in the different stations of the adaptive protocol, that is for different values of "X" packets for increasing the width of the window, as at times 430, 432, 434, etc. will determine a different adaptive cycle time 440 for each flow, etc.

Figure 6:
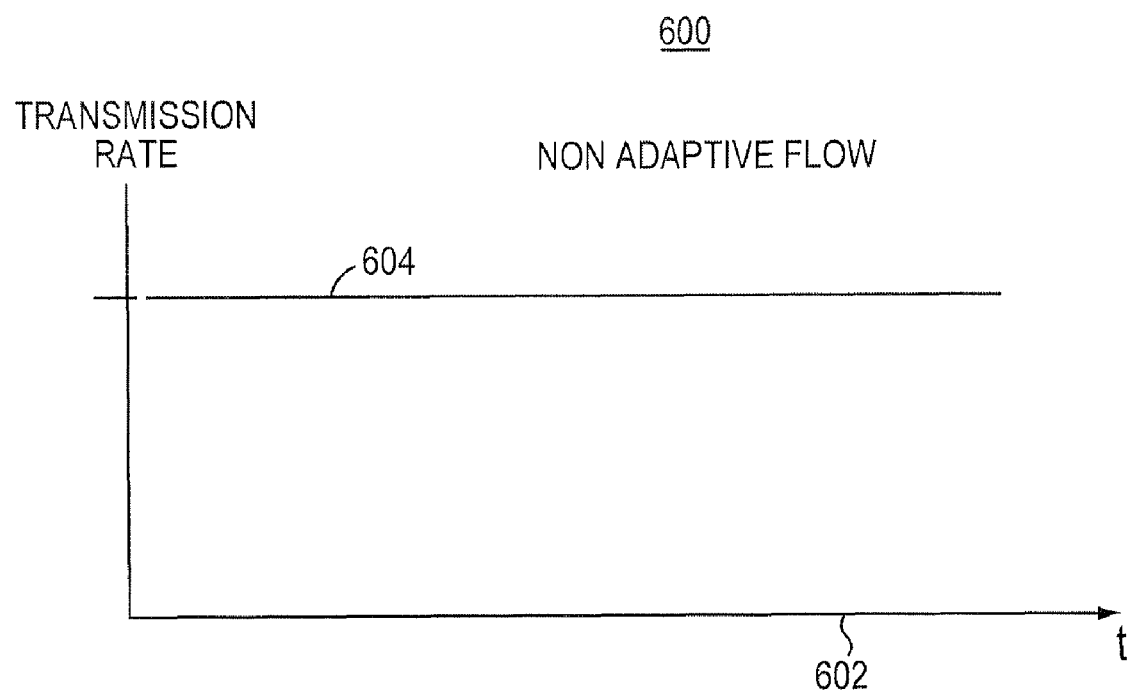
FIG. 6 is a graph giving a transmission rate of a source end station of a non adaptive flow, in accordance with the invention.

Turning now to FIG. 6, the transmission rate of a non-adaptive flow is shown. A source end-station which maintains a constant transmission rate, whether or not ACK messages are received, is shown in graph 600. As time proceeds, as shown along axis 602, the transmission rate of the non-adaptive source station remains constant as shown by curve 604. As the packets transmitted by a non-adaptive source station reach gateway 106, and as adaptive flows reduce their transmission rate as shown in the adaptive flow curve 500 of FIG. 5, the percentage of the packets transmitted by gateway 106 becomes more and more the packets of the non adaptive flow. That is, as the adaptive source stations adapt to congestion in the network, they reduce their transmission rate. However, the non-adaptive flow source stations do not reduce their transmission rate. Thus the non-adaptive flows begin to take larger than their "fair share" of bandwidth from gateway 106, and any other resource in the network through which the packets pass.

Figure 7:
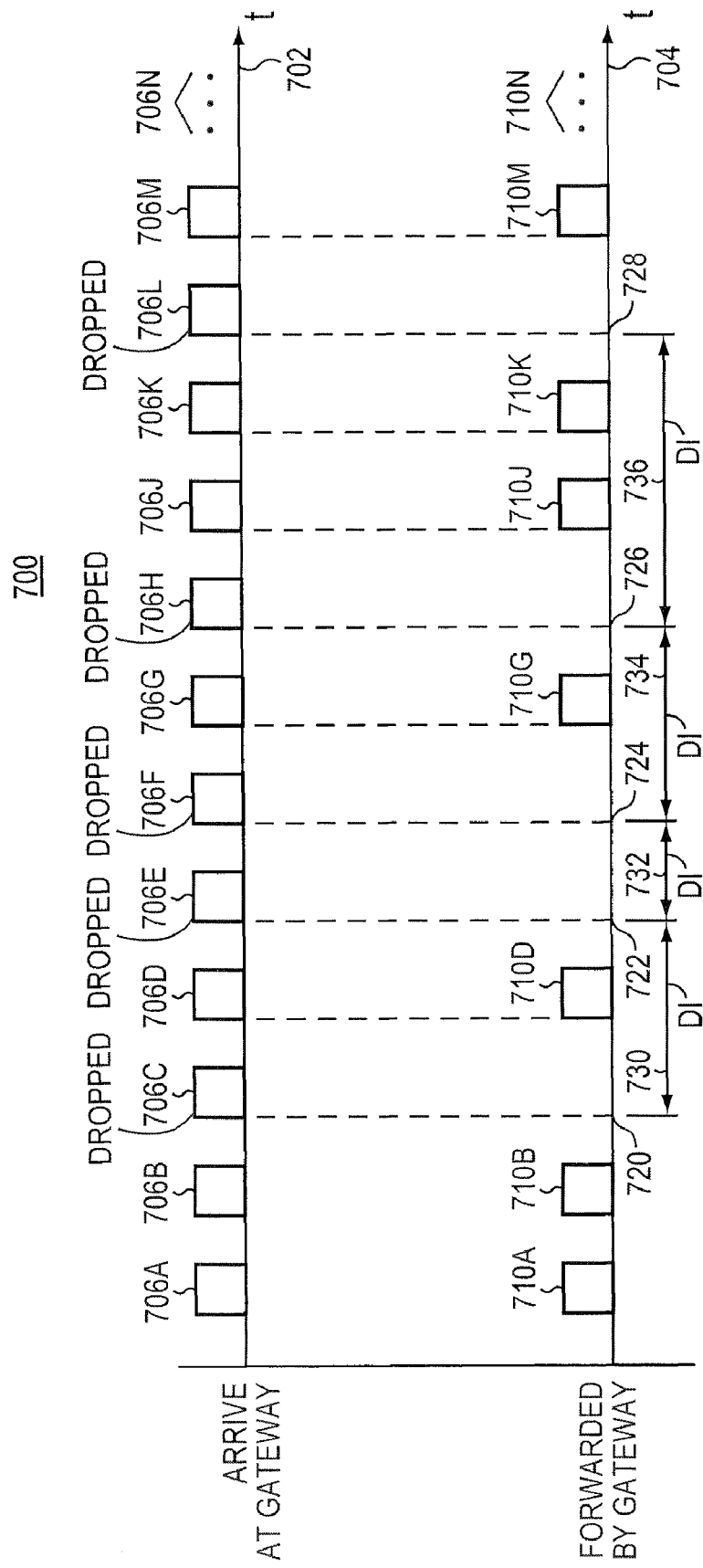
FIG. 7 is a graph giving packet drops of a non-adaptive flow by a RED algorithm controller, in accordance with the invention.

Turning now to FIG. 7, timelines 702 and 704 are shown. Timeline 702 shows packets transmitted by a source station. The packets shown at timeline 702 arrive at a constant rate, and may represent either a burst of packets transmitted by an adaptive flow during a transmission window, or may represent a non-adaptive flow. The packets arrive at the gateway 106 as they pass through the computer network.

Timeline 704 shows packets as they are forwarded by the gateway 106 onto a downstream link. Numerous packets are dropped by gateway 106 through its execution of the RED algorithm, for example as shown in flow chart 300 in FIG. 3. As particular examples, packet 706a arrives at the gateway and is forwarded as packet 710a. Later, packet 706b arrives at the gateway, and is forwarded as packet 710b.

A little later, packet 706c arrives at the gateway, and is dropped by the gateway through its execution of the RED algorithm of process 300 shown in FIG. 3. The time at which the packet is dropped time, 720, is the "drop time" of this packet. Later, packet 706d arrives at the gateway, and is forwarded as packet 710d.

Later packet 706e arrives at the gateway and is dropped by the gateway executing RED process 300 at drop time 722. Later packet 706f arrives at the gateway, and is dropped by the gateway executing RED process 300 at drop time 724.

Later packet 706g arrives at the gateway, and is forwarded as packet 710g by the gateway.

Later packet 706h arrives at the gateway, and is dropped. The drop time for packet 706h is drop time 726.

Later packet 706j arrives at the gateway, and is forwarded as packet 710j. Later packet 706k arrives at the gateway and is forwarded as packet 710k.

Later packet 706L arrives at the gateway and is dropped by the gateway through its execution of RED process 300 at drop time 728. Later packet 706m arrives at the gateway, and is forwarded as packet 710m.

Three dots 706n indicate that more packets from the input flow arrive at the gateway. Three dots 710n indicate that random packets from the arriving packets are dropped through the RED process 300, and that the forwarded packets are forwarded onto a downstream link. Block 322, block 324, and block 326 implement dropping randomly arriving packets in the event that the threshold for imposition of the control law curve 210 is reached in the queue 108 in the gateway.

A drop interval is computed by subtracting the time at which the last earlier packet was dropped from the time that the present packet is dropped. For example, subtracting time 720 from time 722 gives the time interval referred to as the "drop interval" between dropped packet 706c and packet 706e, and is indicated in FIG. 7 as drop interval (DI) 730. Drop Interval (DI) 732 is computed by subtracting the drop time 722 for packet 706e from the drop time 724 for packet 706f. Drop Interval 734 is computed by subtracting drop time 724 for packet 706f from the drop time 726 for packet 706h. Drop Interval 736 is computed by subtracting the time of drop time 726 for packet 706h from the drop time 728 for packet 706L.

The length of the drop interval is the time separating dropped packets. For example, the "length" of drop interval 730 is two packets in time. The length of drop interval 732 is one packet in time. The length of drop interval 734 is three packets in time. The length of drop interval 736 is four packets in time.

The drop interval is conveniently expressed as a sub-multiple of seconds, for example: nanoseconds, microseconds, milliseconds, etc.

Figure 8:
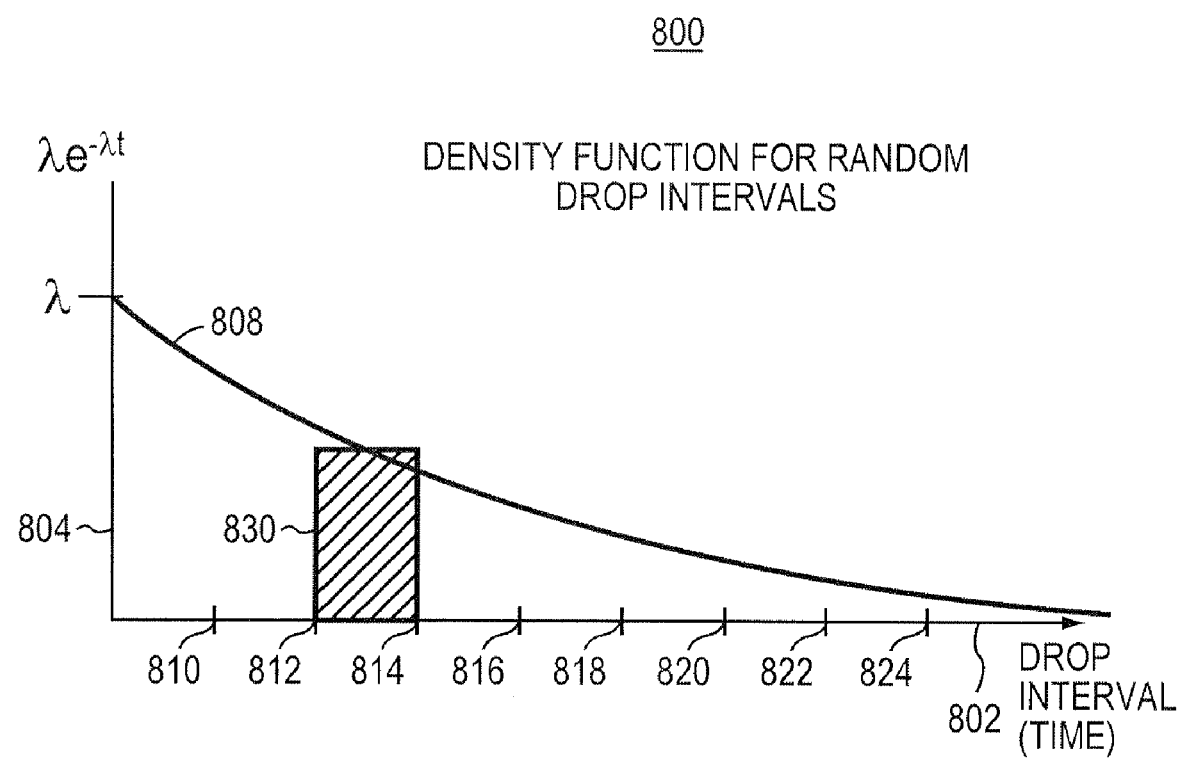
FIG. 8 is a statistical density function for random drop intervals, in accordance with the invention.

Turning now to FIG. 8, the time distribution of drop interval length is shown. Horizontal axis 802 plots the length of a drop interval, as discussed in the above paragraphs. The vertical axis 804 is a normalized density function for random drop intervals. The equation for the density function 808 is:

$$f(t) = \lambda e^{-\lambda t}$$ EQUATION 1

Histogram bar 830 indicates a method of constructing a density function such as density function 808. Histogram bar 830 is constructed by dividing the horizontal drop interval axis 802 into a number of equal portions indicated by cross marks 810, 812, 814, 816, 818, 820, 822, 824, etc. For illustrative purposes, one histogram bar 830 is shown. The height of histogram bar 830 is given by the number of drop intervals occurring between drop interval lengths 812 and drop interval length 814, where the height is properly normalized as a density function. Normalization of the height is achieved by dividing by appropriate factors to bring the height to intersect the curve 808 as computed by equation 1. For example, the histogram bars may be normalized by dividing the number of drop intervals occurring between drop interval length 812 and drop interval length 814 by the total number of packets dropped.

The density function 808 has an exponential dependence on the length of the drop interval as shown by Equation 1, as an example of natural phenomena occurring with a random time distribution. The time intervals of a process occurring randomly are exponentially distributed, and this fact is represented by an exponential density function. Exponential density functions are described by Paul G. Hoel in his book *Introduction to Mathemtical Statistics, Fourth Edition*, published by John Wiley and Sons, Copyright 1971, all disclosures of which are incorporated herein by reference, especially at pages 87-88, and pages 28-31. Also, the exponential density function for randomly occurring natural processes is described by Howard. M. Taylor and Samuel Karlin in their book *An Introduction to Stochastic Modeling, Third Edition*, published by Academic Press, Copyright date 1998, all disclosures of which are incorporated herein by reference.

Turning now to FIG. 9, the table "State Maintained for Dropped Packets" 900 is shown. Table 900 has entries for the state data for dropped packets that is retained in an exemplary embodiment of the invention. Column 902 has an entry for the packet number which was dropped. Table 900 represents, for example, a circular buffer having capacity for a fixed number of packets. After the buffer is filled from maintaining state on dropped packets, the earliest dropped packet is deleted and the next dropped packet is substituted therefore, in a circular buffer technique. Column 904 contains an indicia of the flow of the packet. For example, column 904 may contain the IP Source Address (IP SA), the IP Destination Address (IP DA), and may include other indicia of the flow read from fields of the packet header. For example, information read from various layer 2 fields, various layer 3 fields, and various layer 4 fields, input and output port, etc. may be included in the flow indicia written into an entry of column 904.

Column 906 has written into an entry for each packet dropped, the drop time for that packet. For example, packet 706c has drop time 720, and this drop time is entered into the entry in column 906 for dropped packet 706c. Also, the entry for dropped packet 706e contains in column 906, the drop time 722. Correspondingly, the entry in table 900 for dropped packet 706*f* contains the drop time 724 in column 906, etc.

Turning now to FIG. 10, the table "Flow Analysis for Dropped Packets" 10,000 is shown. The packets recorded in state table 900 are separated by flow, and a table 10,000 is constructed for each flow. The packet number is written into column 10,002. The time of drop, or "drop time" T is written into column 10,004. The "drop" interval is written into column 10,006. The drop interval is computed by subtracting the drop time for the last dropped packet from the drop time for this most recently dropped packet for this particular flow. The drop intervals are computed for dropped packets of a particular flow. This drop interval is written into the entry for the dropped packet in column 10,006.

The drop interval for transmissions which are not adaptive, that is "non-adaptive" flows are exponentially distributed as shown by "Density Function for Random Drop Intervals" 800 in FIG. 8. In contrast, the drop intervals for an adaptive flow as illustrated in FIG. 5, are not exponentially distributed, but cluster about the "adaptive cycle time for one flow" 440 as shown in FIG. 4 and in FIG. 5. This difference in drop time density function, for adaptive flows versus non-adaptive flows, is used as a signal for identifying non-adaptive flows.

Detection of Non-Adaptive Flows

The interaction of responsive flows with the RED algorithm control law is discussed in detail hereinabove, and in the paper "RED in a Different Light", cited herein above. The technique is motivated by the following observations:

1. A RED algorithm drop record produces a random sample of the traffic through the queue during periods of congestion (as indicated by a queue that persists over time).

2. Senders will appear in the drop record roughly in proportion to the amount of bandwidth they are using.

3. Packets of senders that are non-responsive to the drop indications will have a presence in the queue, and thus the drop record, that is roughly uniformly randomly distributed over time. Theory of random processes tells us that the time intervals between these drops will have an exponential distribution. The drops of properly adapting flows should be roughly periodic in their RTT.

4. The parameters of the exponential distribution will change when the persistent queue level changes enough to change the RED algorithm control law and, in general, the drop distribution of the non-responsive flows will follow the overall drop distribution during periods of heavy congestion. However, it is possible to adaptively follow these departures from the exponential hypothesis.

Then a test for whether a flow is non-responsive consists of two parts. First, a flow becomes a candidate for detection when its representation in the drop record is large. Secondly, a statistical hypothesis is made about the distribution of the drop intervals of non-responsive flows and the data is used to confirm or discard this hypothesis. If confirmed, the flow is "detected". Note that we will favor tests that tend toward false negatives rather than false positives under the assumption that we do not want to incorrectly identify a responsive flow as being non-responsive, but this is not a necessary feature of the technique.

Example Implementation that Uses this Technique

An example of an implementation of this technique is:

1. Keep a history of the last D drops as shown in table 900. The information on each drop includes data identifying the flow and the time the drop occurred as shown in table 900. This history is kept in a circular buffer where the oldest drop is aged out when a new drop is added to the record. The size of this record, that is the value of D, should increase with bandwidth (a value of D=3000 is sufficient for a link of 4 Mbps).

2. Each flow with a number of drops in the record significantly larger than the average, D/(number of flows in the current record) is considered a candidate non-responsive flow. This can be a simple metric; here, 1.5 times the average is used, i.e., look at flows that are getting 50% more drops than average.

3. Test each of the candidate non-responsive flows against the hypothesis that its interdrop intervals (the time between the drops of a packet of that flow) are exponentially distributed by using the experimentally determined mean interdrop interval for that flow as an estimate of the average interdrop interval of the flow. Since probability theory gives the median of an exponentially distributed random variable as $0.69 \times$ average, compute this value using the experimentally determined mean value and determine whether it is indeed the median. If it is the median, then about half the intervals in the drop record should be smaller than it. So that we can work in normalized parameters, we compute the number of the flow's intervals that are smaller than the experimental average and divide by the total number of drop intervals. Then, a value greater than 0.5 indicates a flow with more short drop intervals than the predicted median and a value smaller than 0.5 indicates a flow with longer intervals than the predicted median for an exponential. This is a normalized measure of the how the experimentally determined median differs from the predicted median for an exponential distribution with that experimentally determined mean. In the results of the next section, this measure is referred to as the departure from the exponential median (DEM).

4. Due to the changing parameters, the quality of the estimate of the median can change. The experimentally determined average is most accurate when the queue size is not changing sufficiently over the history that the underlying parameters of the exponential distribution are significantly changing. In addition, when the drop intervals get short due to larger persistent queues (an indicator to the active queue controller of congestion), the estimated average value will tend to lag behind the median of the experimental record. For this reason, we've found it useful to use an adjusted estimated median for our hypothesis testing. In congestion, the drops become more frequent while a non-responsive flow continues to arrive at the queue at the same rate. This causes the drop intervals for that flow to follow the distribution of the overall dropping function. Thus its DEM can be larger than 0.5 (indicating smaller drop intervals than predicted by the exponential). A flow whose median is equal to or smaller than this adjusted estimated median is considered to be a non-responsive flow. Other statistical methods exist for determining the underlying distribution of a sample population or for testing the hypothesis that a set of samples are from a exponentially distributed process. We have presented this approach as one possible method that does give good results.

Simulation

Packet traffic in the Internet uses IP, the Internet Protocol, at layer 3. Most of the packet traffic of the Internet uses TCP, the Transmission Control Protocol, as its layer 4 transport. This protocol was designed to respond to congestion indications by reducing its sending rate and adapting to the bandwidth available, sharing a congested link with a rough fairness over time. Congestion is usually indicated by loss, though there has been discussion of marking packets to indicate that they experienced congestion enroute. Transport protocols that respond to congestion indication this way are colloquially termed to be "polite" and this characteristic is important to prevent congestion collapse in the Internet.

When a source of packet traffic in a network does not respond to indications of congestion, it can "push out" all the polite senders who are cutting back on their sending rates, allow unfair sharing of bandwidth at links traversed by both types of flows. Non-responsive flow are defined as those flows that do not respond to congestion indications (packets drops or "marks") by reducing their sending rate. These flows are also sometimes called non-adaptive flows.

Previously, all proposed techniques to identify non-responsive flows have required keeping a good deal of per-flow state continuously, on responsive as well as non-responsive flows. In addition, some partial techniques have been proposed that required changes to hosts and/or knowledge about the round-trip times of the individual flow connections. Our approach requires a smaller amount of state, is only instantiated during periods of congestion and most of the state is only for a subset of flows receiving drops.

This technique can be implemented in network devices that use an active queue management algorithm that drops or marks packets to control the persistent queue (after this, the term "dropped" indicates "dropped or marked"). The idea is that based on relatively simple statistical properties, it is possible to use the dropped packet record to determine whether the individual flows conform to modern congestion control rules or not. General characteristics of and the need for such a technique have been discussed for years as the method of determining whether to place a flow in a "penalty box", but much of the discussion has centered on the difficulty of separating non-responsive flows from responsive flows with shorter-than-average round trip times (RTTs). This concern is justified if only the number of drops is used. By using a combination of simple robust statistics on the record of dropped packets, these may be distinguished.

It is important to test whether the packet traffic conforms to modern congestion control rules rather than simply testing whether packets are using TCP or not because 1) new transport protocols may be devised and deployed that are not TCP and 2) not all TCPs are correctly implemented and may, in fact, not adapt properly to congestion.

Extensive simulation studies of the RED active queue management approach were used to verify that the distribution of drop intervals is indeed quite different for responsive flows (even with different RTTs) and for non-responsive flows.

Robust statistics (e.g., hinge and quantile) of the samples were used.

Simulation Results from the Example Approach

In following experiments, a constant bit-rate (CBR) source of packets is used to create a non-responsive flow. The responsive flows are long lived TCPs, for example file transfers protocol's (FTPs) of 2 GB files, which persist for milliseconds. Unless otherwise stated, all the TCPs had 100 ms round trip times.

Experiment 1

A Non-Responsive Flow in an Increasing Load of FTP's

One CBR composed of 1500 byte packets sent at a 0.4 Mbps rate and 30 FTPs (with an maximum transmission unit of 1500 bytes) share a 4 Mbps link. The total simulation time is 1200 seconds, or 20 minutes. The CBR flow is active for the entire simulation. From 0 to 520 seconds, only 9 FTPs were active, thus each flow received about 0.4 Mbps. Starting at 520 seconds, one additional FTP began transferring every 20 seconds until the time reached 920 seconds.

A drop record of 3000 samples was used to calculate the statistics, thus results begin at about 450 seconds. After that, each new drop was used in a new calculation and the oldest drop was deleted, creating a "sliding" history. For statistical significance, only flows with more than 80 drops were used, accounting for the fact that the drop numbers all started at 80.

Figure 11:
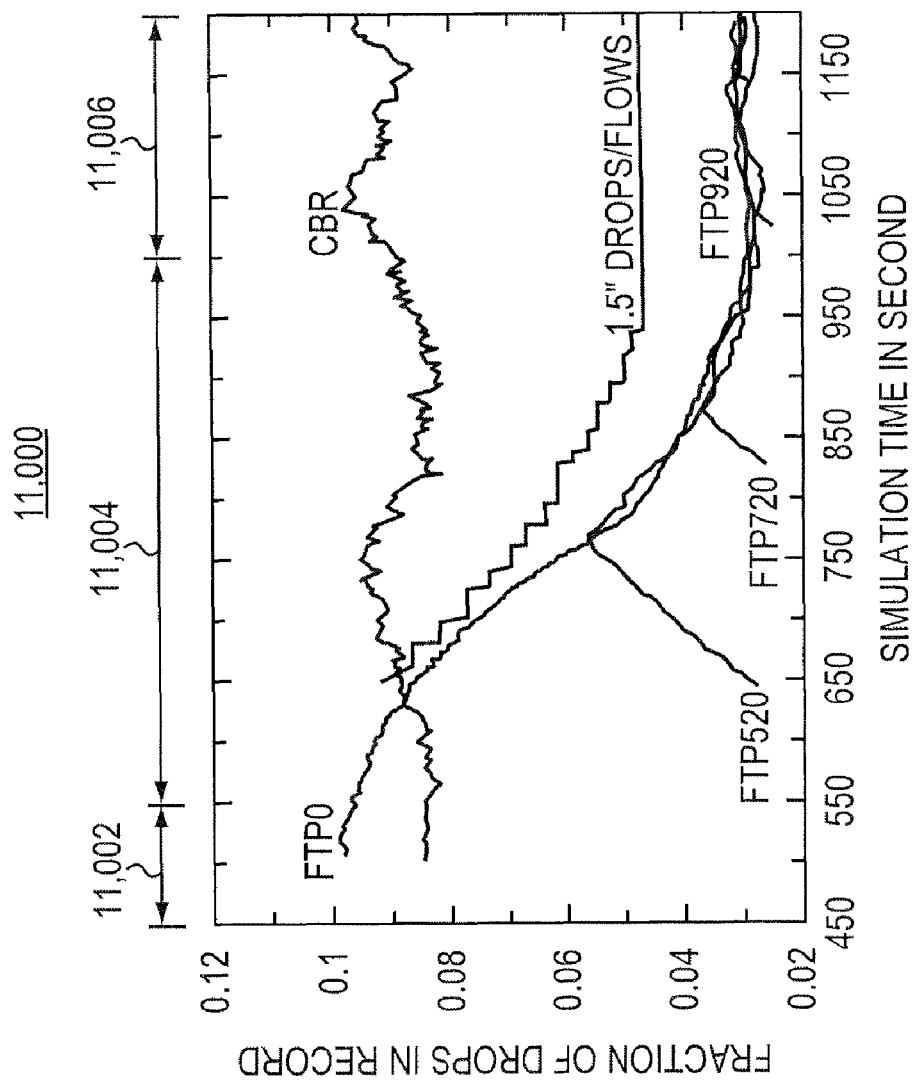
FIG. 11 is a graph giving a plot of results obtained from a simulation of a congested network, in accordance with the invention.
Figure 12:
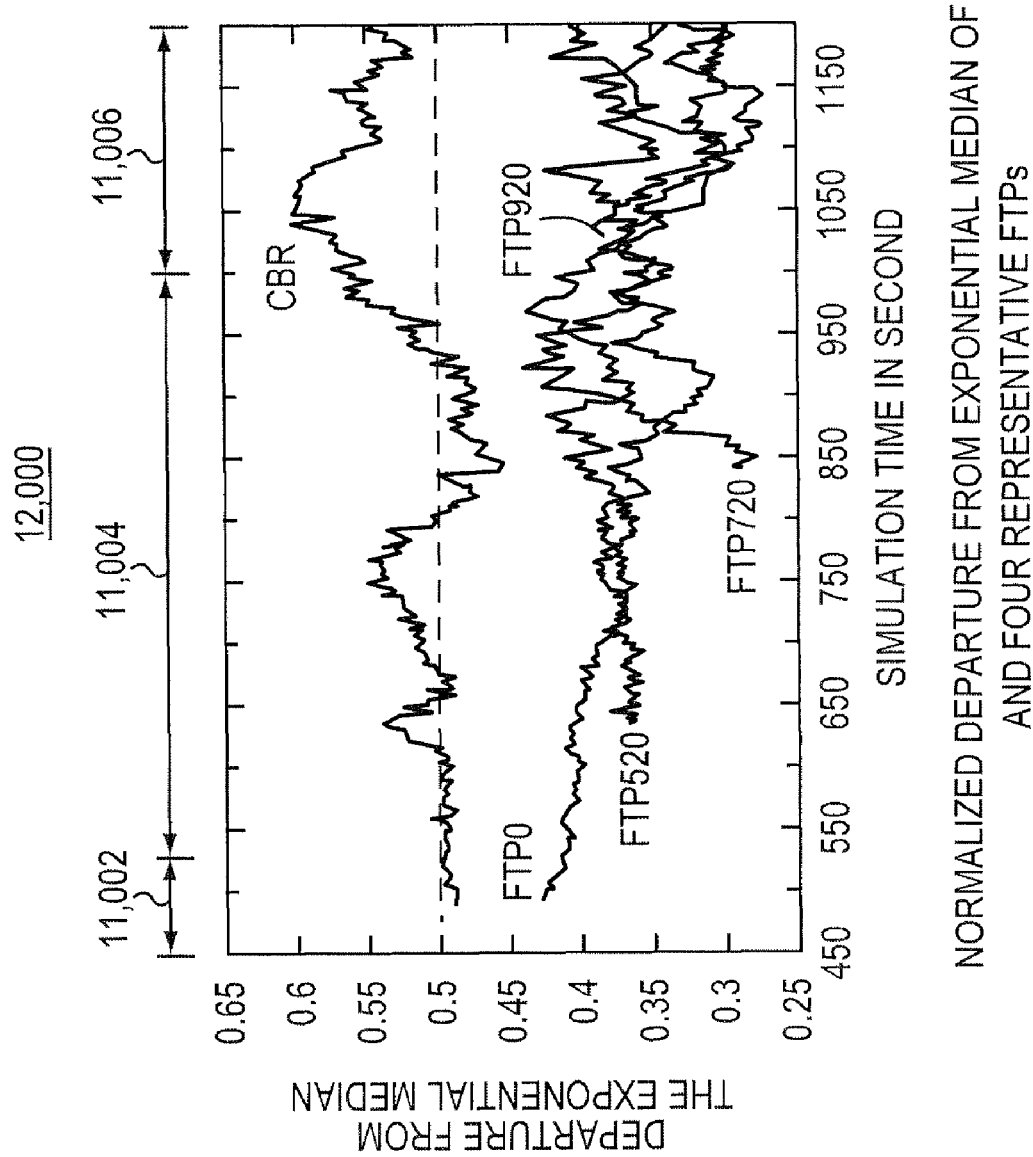
FIG. 12 is a graph giving a plot of results obtained from a simulation of a congested network, in accordance with the invention.

Turning now to FIG. 11 and FIG. 12, simulation graphs 11,000 and 12,000 are shown. FIG. 11 shows the number of drops for each individual flow over the simulation time. FIG. 12 shows the DEM of each flow during the same period. FIG. 1 plots the CBR flow, one representative FTP flow that starts at time 0 (denoted as FTP0), and the FTPs starting at 520, 720 and 920 seconds. The curves are clearly divided into three time domains 11,002, 11,004 and 11,006:

1.1. During time domain 11,002, from 450 to 520 seconds, where the 9 FTPs share bandwidth nearly equally with the CBR.

2.2. During time domain 11,006, from 520 to 1000 seconds, where the number of flows is increasing steadily (though the last flow joined at 920 seconds, the system took some time to reach a stable state).

3.3. During time domain 11,006, from 1000 to 1200 seconds, where the number of flows on the link remained stable.

During the first stage 11,002, each flow gets about 0.38 Mbps and flow drop rates were in the range 1.7-2.1%. As evident in FIG. 11, the 10 active flows are each getting about 10% of the drops in the drop record (CBR's share is a little bit less, 8-9%. This is consistent with TCP's known behavior of "hunting" for the current bandwidth available). During this time, the non-responsive flow passes the first test. This indicates that the non-responsive flow is not using more than its "fair share" of the link bandwidth, so it is not necessary to detect it.

During the second stage 11,004, as more flows were added, the FTP0 share decreased almost linearly, from 0.38 Mbps to 0.1 Mbps, as did its number of drops. The CBR, being non-responsive, kept sending at the 0.4 Mbps rate and therefore, got a nearly constant number of drops and a slight decrease in throughput from 0.38 Mbps to 0.37 Mbps. The number of drops for FTP520 started from a few drops and increased steadily until it followed the number of drops for FTP0. This behavior is due to the ramping up of TCP's slow-start algorithm, where the connection begins with a small sending window and increases it until it receives its first drop. The other two FTPs, FTP720 and FTP920, have this same behavior. During this time domain 11,004, the overall queue drop rate increases from 1.9% to 7.5%. In stage three 11,006, FTPs had drops per flow ranging from 81 to 99, averaging 90 drops in the 3000 drop record. The CBR got about 280 drops in each drop record. This reflects their relative share: CBR got about three times the bandwidth of any FTP (0.37 Mbps vs. 0.11 Mbps). The overall drop rate was quite high, around 7.5%.

FIG. 12 shows the DEM of the same flows over the same period. Notice that the DEM of the CBR flow is consistently higher than those of FTPs even when their bandwidth usage and drop rates are similar.

When drop rate is low (stage one 11,002), the CBR has a DEM of about 0.5 while the FTP is about 0.35 to 0.43. As the overall drop rate increased, the DEM of all the flows increased, though the difference is clear and usually about the same: 0.1 to 0.15. FIG. 12 clearly shows the different distributions of the drops. The exceptions are where conditions are changing and the number of drops of the adapting flow are still not large enough to put it in the pool of candidate non-responsive flows. The increase of DEM with drop rate can be understand as follows: at low drop rates, the RED algorithm queue management drops the packets at a fairly steady pace and connections tend to receive their drops at the expected time. The CBR's drop interval is clearly exponentially distributed as expected and thus has a DEM of 0.5. At high drop rates, the RED algorithm's drop probability gets a bit skewed because of the "force drops". In fact, the CBR will tend to get more of the clustered or close together drops since it continues to show up at the queue in the same pattern while the FTPs will reduce their sending rate. At a drop rate of 7.5%, many drops are clustered and the drop intervals are quite small. Therefore, the DEM tends to be larger than the "expected" value. These changes in DEM caused by increasing congestion may require some changes in the method of statistical detection of non-responsive flows. This suggests a possible adjustment to the estimated median related to the system drop rate, although it's not clear from these results that such an adjustment is needed.

Experiment 2

Adding a Short RTT FTP to the Mix

In experiment 1, all FTPs had a round trip time of 100 ms. Thus in the presence of congestion, every FTP decreased its share and the CBR had a clear advantage over FTP. However, if an FTP has a shorter round trip time, it can get a larger share of drops due to its faster response. A detection method for non-responsive flows should not misidentify a short RTTT flow as a non-responsive one.

Figure 13:
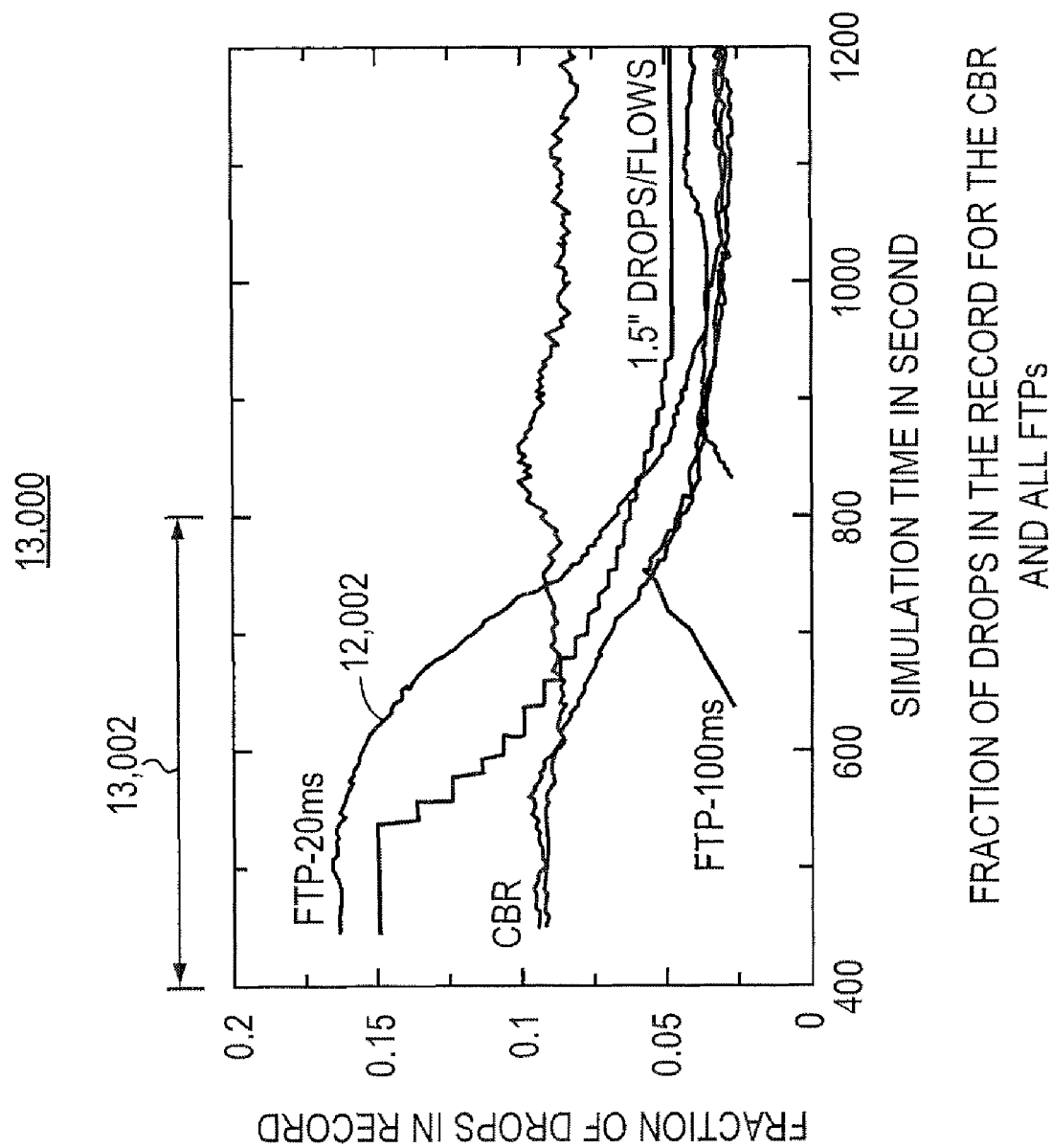
FIG. 13 is a graph giving a plot of results obtained from a simulation of a congested network, in accordance with the invention.

Turning now to FIG. 13, graph 13,000 give the response in experiment 2. In experiment 2, we used the same configuration as experiment 1, except that one of the 9 FTPs that starts at time 0 has a round trip time of 20 ms instead of 100 ms. We show in FIG. 13 and FIG. 14 that though the short-RTT FTP 12,002 gets a large share compared to other FTPs or CBR, it is more like a standard TCP than the CBR. In other words, we are able to differentiate the short-RTT TCP from a non-responsive connection, even when both get disproportionate bandwidth shares. This second criterion is important in the range from the start of the trace until just past 800 seconds interval 13,002.

During the first period, the short-RTT FTP got the largest share (about 0.68 Mbps) and the most drops (about 510 out of 3000); the CBR had far fewer drops than the short-RTT FTP, about the same as the 100 ms RTT FTPs (0.34 Mbps share). The system drop rate was 2.1%. As number of FTPs increased in the second time period, the system drop rate increased and all the FTPs decreased their sending rate. The link share of the short-RTT FTP decreased sharply as it responded to these drops. At 750 seconds, the CBR drops start to exceed the short-RTT FTP drops. After that, the system drop rate climbed to 7-8% and the non-responsive CBR has a larger share than the short-RTT FTP.

Figure 14:
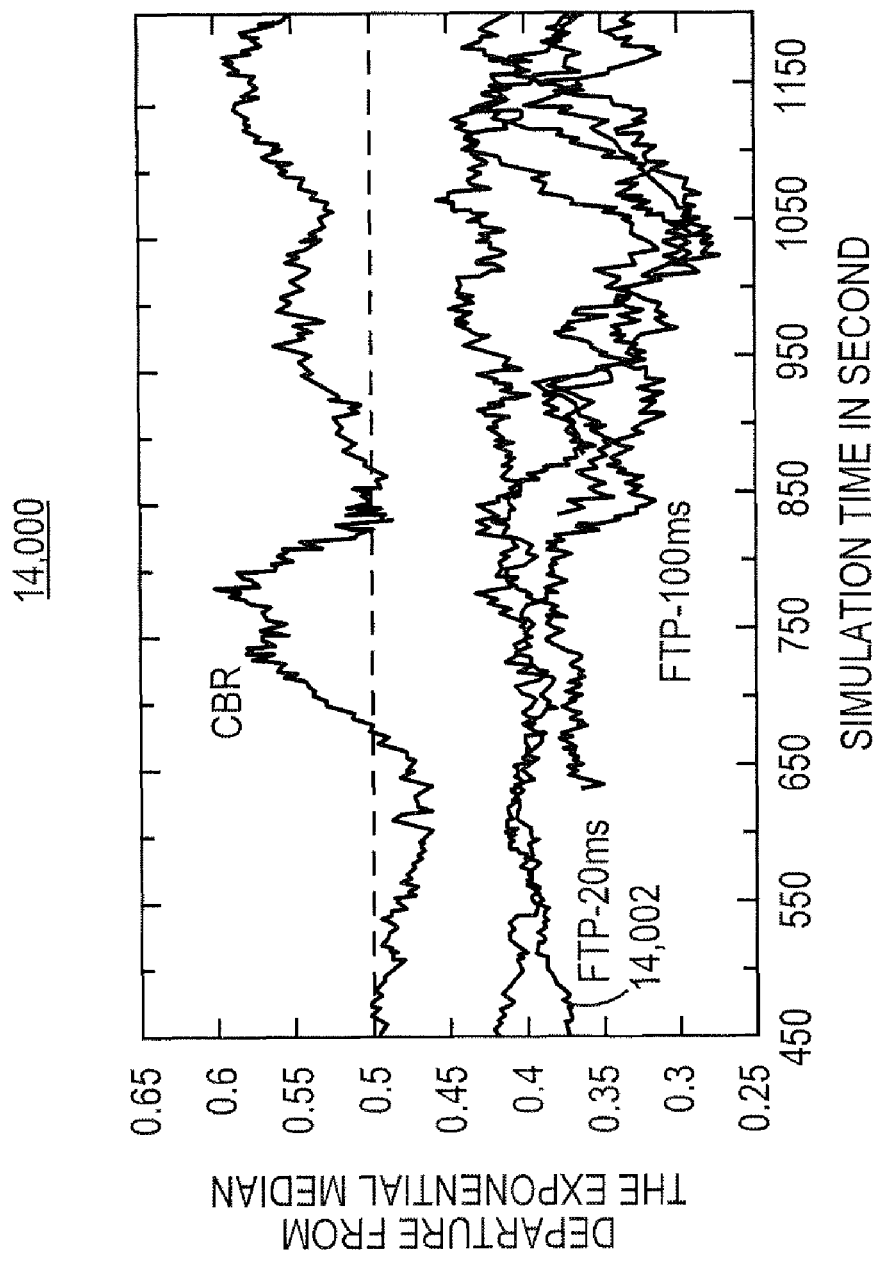
FIG. 14 is a graph giving a plot of results obtained from a simulation of a congested network, in accordance with the invention; and, FIG. 15 is a block diagram of a typical network device.

Turning now to FIG. 14, graph 14,000 shows the DEM for experiment 2. Note that, use of the DEM measure always shows the short-RTT flow 14,002 as a responsive flow using these simple measures. Though the short-RTT FTP had more drops than the CBR for 300 seconds, it was consistently lower than the CBR's DEM as seen in FIG. 14. This behavior holds for all the traffic we have tried.

In summary:
1. Relative bandwidth sharing can be measured easily using the drop records from RED algorithm queue management.

2. Responsive and non-responsive flows can be differentiated by the experimentally determined distribution of their drop intervals.

3. High system drop rates can affect the statistical criterion used here, but in a way that still permits detection.

Figure 15:
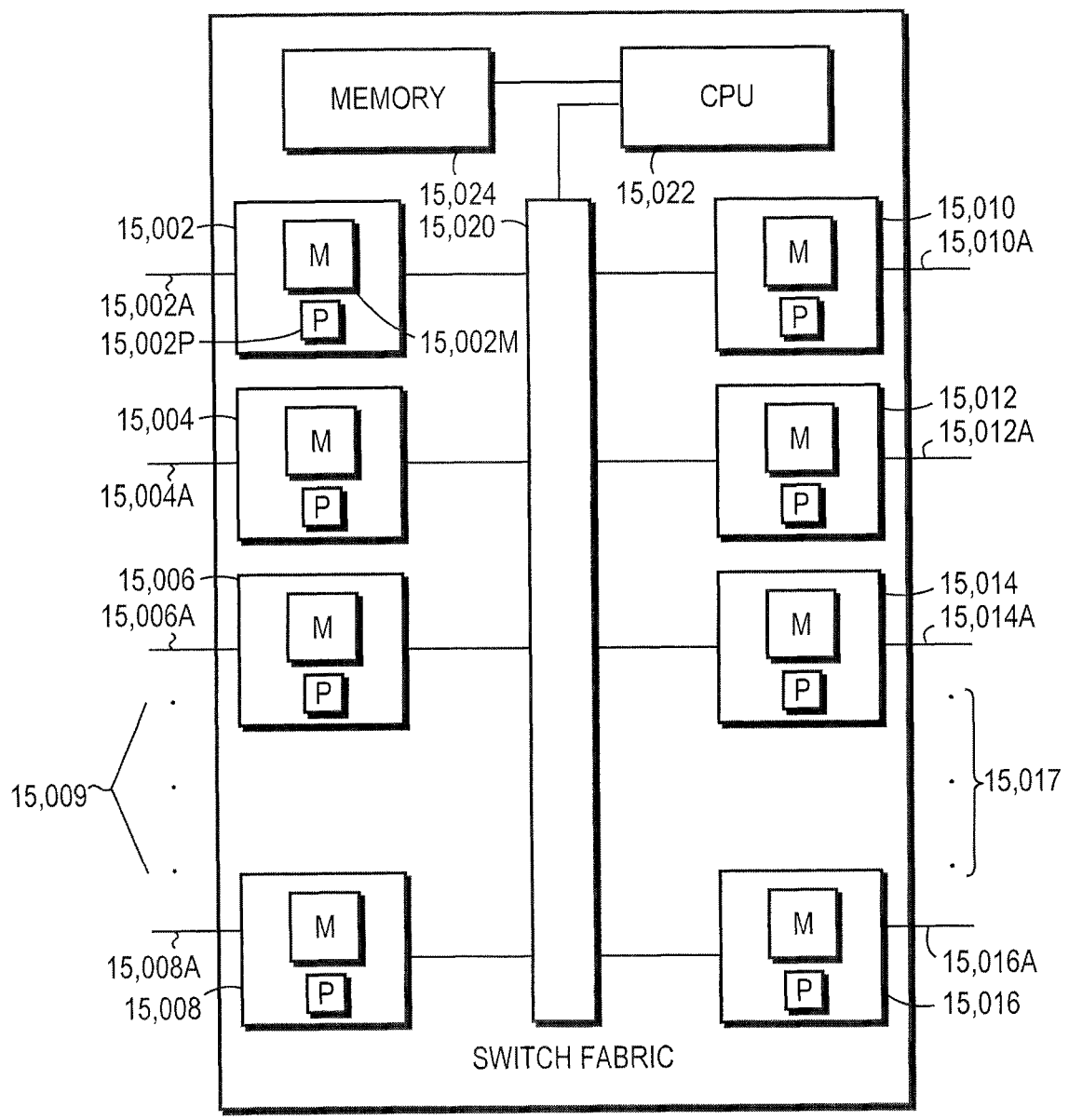

Turning now to FIG. 15, block diagram 15,000 of a representative structure for internal operation of a router is shown. Each linecard 15,002, 15,004, 15,0056, 15,008, 15,010, 15,012, 15,014, 15,016 supports a port. For example, linecard 15,002 has port 15,002A; linecard 15,004 has port 15,004A; linecard 15,006 has port 15,006A, . . . and linecard 15,016 has port 15,016A, etc. Each linecard has a memory unit M. For example, representative linecard 15,002 has memory unit M 15,002M, and each of the linecards has a memory unit M. Each line card has a processor P. For example, representative linecard 15,002 has processor P 15002P, and each of the linecards has a processor P. The various linecards are interconnected by switch fabric 15,020. Switch fabric 15020 may be implemented using a cross bar switch, by using an ATM type fabric, etc. A central processor CPU 15,022 operationally connects with each of the line cards. CPU 15,022 has memory unit 15,024.

In operation, a packet arrives at a port of a linecard and is transferred into linecard memory M, for example memory 15,002M. For example, in the event that a packet is received from an external connection at port 15,002A, the packet arrives at port 15,002A and is stored in linecard memory unit 15002M. Circuits on the linecard interpret the fields of the incoming packet and read the IP SA address, and read the IP DA field 302. The local line card processor then assists a lookup in the routing table maintained in linecard memory M, for example 15,002M. In the event that an entry for this SA and DA combination is found, the packet is routed to the proper output port. The packet is transferred through switch fabric 15,020 to the output port.

In the event that no entry is found in the routing table, information is passed to CPU 15,022. CPU 15,022 then executes protocols to locate a route to the destination computer having destination address DA. The received packet is then routed to a port leading toward the route output DA. The routing table maintained in line card memory M is then updated with the new route to the station having the DA.

Three dots 15,009 and 15,017 indicate that a large number of linecards may be supported by the router. In an alternative embodiment of the invention, each line card may support a plurality of ports, rather than just the one port shown in exemplary router 15000.

It is to be understood that the above-described embodiments are simply illustrative of the principles of the invention. Various other modifications and changes may be made by those skilled in the art which embody the principles of the invention and fall within the spirit and scope thereof.

What is claimed is:
1. A method for operating a network device, comprising:
receiving a plurality of packets by the network device;
dropping at least some packets of the plurality of packets on a random basis using a Random Early Detection (RED) algorithm, to make dropped packets, and observing a time at which each of the dropped packets were dropped;
reading indicia of a flow from at least one field of a header of the dropped packets;
calculating drop intervals for packets of the flow dropped by the RED algorithm, in response to the times at which the dropped packets were dropped by the RED algorithm;

determining a distribution of length of the drop intervals for packets of the flow dropped by the RED algorithm; and in response to the length of the drop intervals for packets of the flow dropped by the RED algorithm being substantially exponentially distributed, identifying the flow as a non-adaptive flow.

2. The method of claim 1 further comprising:

calculating the drop intervals by subtracting from a first time at which a most recently received packet was dropped, a second time at which an earlier dropped packet was dropped.

3. A method for operating a network device, comprising:

receiving a plurality of packets by the network device;

dropping at least some packets of the plurality of packets on a random basis using a Random Early Detection (RED) algorithm, to make dropped packets, and observing a time at which each of the dropped packets were dropped;

reading indicia of a flow from at least one field of a header of the dropped packets;

calculating intervals for packets of the flow dropped by the RED algorithm, in response to the times at which the dropped packets was were dropped by the RED algorithm;

calculating an average drop interval for the flow;

calculating a median drop interval for the flow, the median drop interval having one half of the drop intervals larger than the median and having one half of the drop intervals less than the median; and, computing a statistical difference by subtracting 0.693 times the average drop interval from the median drop interval, and in the event that the statistical difference exceeds a selected threshold, identifying the flow as a non-adaptive flow.

4. The method of claim 3 further comprising:

computing a "departure from exponential mean" (DEM) value, the DEM value computed by subtracting from the 0.693 times the average drop interval, the median drop interval; and, comparing the DEM value with the number 0.5, and in the event that the DEM value is within a preselected range of 0.5, to identify the flow as non-adaptive.

5. The method of claim 4 further comprising:

selecting the preselected range between 0.45 and any number larger than 0.5.

6. The method as in claim 4 further comprising:

selecting the preselected range dynamically in response to DEM values of selected flows.

7. The method as in claim 6 further comprising:

selecting the selected flows as a subset of all flows, the subset having selected values of DEM less than a largest value of DEM computed in a set of flows.

8. The method of claim 1 further comprising: executing the method in a router.

9. The method of claim 1 further comprising: executing the method in a switch.

10. A network device, comprising:

means for receiving a plurality of packets at the network device;

means for dropping at least some packets of the plurality of packets on a random basis using a Random Early Detection (RED) algorithm, to make dropped packets, and observing a time at which each of the dropped packets were dropped;

means for reading indicia of a flow from at least one field of a header of the dropped packets;

means for calculating drop intervals for packets of the flow dropped by the RED algorithm, in response to the time at which the dropped packets were dropped by the RED algorithm;

means for determining a distribution of length of the drop intervals for packets of the flow dropped by the RED algorithm; and means for identifying the flow as a non-adaptive flow in response to the length of the drop intervals for packets of the flow dropped by the RED algorithm being substantially exponentially distributed.

11. The network device of claim 10, further comprising:

means for calculating the drop intervals by subtracting from a first time at which a most recently received packet was dropped, a second time at which an earlier dropped packet was dropped.

12. A network device, comprising:

means for receiving a plurality of packets at the network device;

means for dropping at least some packets of the plurality of packets on a random basis using a Random Early Detection (RED) algorithm, to make dropped packets, and observing times at which the dropped packets were dropped;

means for reading indicia of a flow from at least one field of a header of the dropped packets;

means for calculating drop intervals for packets of the flow dropped by the RED algorithm, in response to the time at which the dropped packets were dropped by the RED algorithm;

means for calculating an average drop interval for the flow;

means for calculating a median drop interval for the flow, the median drop interval having one half of the drop intervals larger than the median and having one half of the drop intervals less than the median; and, means for computing a statistical difference by subtracting 0.693 times the average drop interval from the median drop interval, and in the event that the statistical difference exceeds a selected threshold, identifying the flow as a non-adaptive flow.

13. The network device of claim 12, further comprising:

means for computing a "departure from exponential mean" (DEM) value, the DEM value computed by subtracting from the 0.693 times the average drop interval, the median drop interval; and, means for comparing the DEM value with the number 0.5, and in the event that the DEM value is within a preselected range of 0.5, to identify the flow as non-adaptive.

14. The network device of claim 13, further comprising:

means for selecting the preselected range between 0.45 and any number larger than 0.5.

15. The network device of claim 13, further comprising:

means for selecting the preselected range dynamically in response to DEM values of selected flows.

16. The network device of claim 15, further comprising:

means for selecting the selected flows as a subset of all flows, the subset having selected values of DEM less than a largest value of DEM computed in a set of flows.

17. The network device of claim 10, further comprising: the network device is a router.

18. The network device of claim 10, further comprising: the network device is a switch.

19. A network device to identify a non-adaptive flow, comprising:

at least one processor to execute computer instructions;

first instructions executed by the at least one processor to drop packets on a random basis using a Random Early Detection (RED) algorithm;

a classifier to read indicia of a selected flow from at least one field of a header of a packet received by the device;

second instructions executed by the at least one processor to calculate drop intervals for packets of the selected flow dropped by the RED algorithm, in response to times at which the packets were dropped by the RED algorithm; and, third instructions executed by the at least one processor to determine a distribution of length of the drop intervals for the packets of the flow dropped by the RED algorithm, and, in response to the length of the drop intervals being substantially exponentially distributed, to identify the flow as a non-adaptive flow.

20. The network device of claim 19, further comprising:
the at least one processor to execute the second instructions to calculate the drop intervals by subtraction from a first time at which the most recently received packet was dropped, a second time at which an earlier dropped packet was dropped.

21. A network device to identify a non-adaptive flow, comprising:

at least one processor to execute computer instructions;

first instructions executed by the at least one processor to drop packets on a random basis using a Random Early Detection (RED) algorithm;

a classifier to read indicia of a selected flow from at least one field of a header of a packet received by the device;

second instructions executed by the at least one processor to calculate drop intervals for packets of the selected flow dropped by the RED algorithm, in response to times at which the packets were dropped by the RED algorithm;

third instructions executed by the at least one processor to calculate an average drop interval, and to calculate a median drop interval for the selected flow, the median drop interval having one half of the drop intervals larger than the median and having one half of the drop intervals less than the median; and, fourth instructions executed by the at least one processor to compute a statistical difference by subtraction of 0.693 times the average drop interval from the median drop interval, and in the event that the statistical difference exceeds a selected threshold, to identify the selected flow as a non-adaptive flow.

22. The network device as in claim 21 further comprising:
fifth instructions executed by the at least one processor to compute a "departure from exponential mean" (DEM) value, the DEM value computed by subtraction from the 0.693 times the average drop interval, the median drop interval; and, sixth instructions executed by the at least one processor to compare the DEM value with the number 0.5, and in the event that the DEM value is within a preselected range of 0.5, to identify the selected flow as non-adaptive.

23. The network device as in claim 22 wherein the preselected range is between 0.45 and any number larger than 0.5.

24. The network device as in claim 22 further comprising:
seventh instructions executed by the at least one processor to select the preselected range dynamically in response to DEM values of selected flows.

25. The network device as in claim 22 further comprising:
eighth instructions executed by the at least one processor to select the selected flows as a subset of all flows, the subset having selected values of DEM less than a largest value of DEM computed in a set of flows.

26. The network device as in claim 19, further comprising:
the network device is a router.

27. The network device as in claim 22, further comprising:
the network device is a switch.

28. A computer readable media, comprising instructions for execution on a processor of a network device, the instructions, when executed, to:

receive a plurality of packets at the network device;

drop at least some packets of the plurality of packets on a random basis using a Random Early Detection (RED) algorithm, to make dropped packets, and observe a time at which the dropped packets were dropped;

read indicia of a flow from at least one field of a header of the dropped packets;

calculate drop intervals for packets of the flow dropped by the RED algorithm, in response to the times at which the dropped packets were dropped by the RED algorithm;

determine a distribution of length of the drop intervals for packets of the flow dropped by the RED algorithm; and in response to the length of the drop intervals for packets of the flow dropped by the RED algorithm being substantially exponentially distributed, identify the flow as a non-adaptive flow.

29. The method of claim 1 further comprising:
steering a packet of the identified non-adaptive flow to a lower priority queue.

30. The network device of claim 19, further comprising additional instructions executed by the at least one processor to steer a packet of the identified non-adaptive flow to a lower priority queue.

31. The method of claim 1 further comprising:
in response to the length of the drop intervals for packets of the flow dropped by the RED algorithm being not substantially exponentially distributed, identifying the flow as an adaptive flow.

* * * * *